(12) United States Patent
Carlson

(10) Patent No.: US 6,394,239 B1
(45) Date of Patent: *May 28, 2002

(54) CONTROLLABLE MEDIUM DEVICE AND APPARATUS UTILIZING SAME

(75) Inventor: J. David Carlson, Cary, NC (US)

(73) Assignee: Lord Corporation, Cary, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 08/959,775

(22) Filed: Oct. 29, 1997

(51) Int. Cl.⁷ ................................................. F16F 9/53
(52) U.S. Cl. ................................. 188/267.2; 188/267.1
(58) Field of Search .......................... 188/267, 267.1, 188/267.2; 267/140.14, 140.15

(56) References Cited

U.S. PATENT DOCUMENTS

| | | | |
|---|---|---|---|
| 2,544,360 A | 3/1951 | Schmidt | 192/12 |
| 2,575,360 A | 11/1951 | Rabinow | 192/21.5 |
| 2,661,596 A | 12/1953 | Winslow | 60/52 |
| 2,667,237 A | 1/1954 | Rabinow | 188/88 |
| 2,733,792 A | 2/1956 | Saxl | 192/21.5 |
| 3,174,587 A | 3/1965 | Walton | 188/87 |
| 3,216,542 A | 11/1965 | Comstock | 192/21.5 |
| 3,394,784 A | 7/1968 | Searle | 192/21.5 |
| 3,509,742 A | 5/1970 | Bauer | 68/23.1 |
| 3,739,887 A | 6/1973 | Ruget | 192/21.5 |
| 3,945,226 A | 3/1976 | De Hedouville | 68/23.1 |
| 3,962,595 A | 6/1976 | Eddens | 310/93 |
| 4,123,675 A | 10/1978 | Moskowitz et al. | 310/49 R |
| 4,200,003 A | 4/1980 | Miller | 74/574 |
| 4,350,913 A | 9/1982 | Eddens | 310/103 |

(List continued on next page.)

FOREIGN PATENT DOCUMENTS

| | | | |
|---|---|---|---|
| EP | 0 487 311 A1 | 11/1991 | |
| EP | 0 535 443 A1 | 9/1992 | |
| FR | 2 484 484 | 6/1980 | |
| FR | 2 511 401 | 8/1981 | |
| GB | 1282568 | * | 7/1972 |
| JP | 63-190945 | * | 8/1988 |
| JP | 4-272529 | * | 9/1992 |
| JP | 08019687 | | 1/1996 |
| WO | WO 98/04846 | | 2/1998 |

OTHER PUBLICATIONS

Translation of SU 1692577, Nov. 1991.*
"Electromagnetic Particle Clutches and Brakes", Warner Electric Brochure Approx. 1995.
"FASTEP Magnetic Particle Clutches and Brakes" Magnetic Power Systems, Inc. Brochure Jul. 1994.
"Magnetic Particle Clutches & Brakes", Placid Industries, Inc. Brochure Approx. 1995.
"SOFTSTEP Magnetic Particle Clutches and Brakes", Magnetic Power Systems, Inc. Brochure Approx. 1995.
"Commercial Magnetorheological Fluid Devices" J.D. Carlson, D.M. Catanzarite and K.A. St. Clair. Lord Corporation Library of Technical Articles. Nov. 1995.

Primary Examiner—Paul N. Dickson
Assistant Examiner—Bradley King
(74) Attorney, Agent, or Firm—Michael M. Gnibus

(57) ABSTRACT

A controllable medium device for resisting movement (rotary, linear, or sliding) between two relatively moveable members includes a first member and a second member coupled for relative movement having a working space between them, and a controllable medium retaining structure, for example, an absorbent matrix, to hold a controllable medium only in the working space. A field generating coil is mounted to one of the first and second members to generate a field acting on the first and second members and the controllable medium in the working space. The rheology change in the medium produced by the field results in resistance to relative movement of the first and second members. A device according to the invention may be used in apparatus, such as washing machines, exercise equipment, air supported tables, and a range of other apparatuses that would benefit from controlled damping or braking.

16 Claims, 12 Drawing Sheets

U.S. PATENT DOCUMENTS

| | | | |
|---|---|---|---|
| 4,351,515 A | 9/1982 | Yoshida | 267/8 |
| 4,681,197 A | 7/1987 | Pedu | 192/21.5 |
| 4,720,087 A | 1/1988 | Duclos et al. | 267/140.1 |
| 4,729,458 A | 3/1988 | Bauer et al. | 188/129 |
| 4,849,120 A | 7/1989 | Price et al. | 252/62.52 |
| 4,856,631 A | 8/1989 | Okamoto et al. | 192/21.5 |
| 4,920,929 A | 5/1990 | Bishop | 123/41.49 |
| 4,992,190 A | 2/1991 | Shtarkman | 252/67.52 |
| 5,000,299 A * | 3/1991 | Goto et al. | 188/267 |
| 5,015,926 A | 5/1991 | Casler | 318/9 |
| 5,018,606 A * | 5/1991 | Carlson | 188/267 |
| 5,070,565 A | 12/1991 | Sood et al. | 8/159 |
| 5,080,204 A | 1/1992 | Bauer et al. | 188/129 |
| 5,081,882 A | 1/1992 | Kogure | 74/574 |
| 5,085,064 A | 2/1992 | Hayashi et al. | 68/23.001 |
| 5,207,081 A | 5/1993 | Fuse | 68/23.1 |
| 5,230,229 A | 7/1993 | Stadlmann et al. | 68/23.1 |
| 5,284,330 A | 2/1994 | Carlson et al. | 267/140.14 |
| 5,375,282 A | 12/1994 | Dausch et al. | 8/159 |
| 5,382,373 A | 1/1995 | Carslon et al. | 252/62.55 |
| 5,449,053 A * | 9/1995 | Maciejewski | 188/267 |
| 5,452,957 A | 9/1995 | Duggan | 384/99 |
| 5,460,585 A | 10/1995 | Gentry et al. | 482/1 |
| 5,492,312 A | 2/1996 | Carlson | 267/140.14 |
| 5,520,029 A | 5/1996 | Savkar | 68/23.3 |
| 5,547,049 A | 8/1996 | Weiss et al. | 188/267 |
| 5,573,088 A | 11/1996 | Daniels | 188/267 |
| 5,598,908 A | 2/1997 | York et al. | 192/21.5 |
| 5,632,361 A | 5/1997 | Wulff et al. | 188/267 |
| 6,019,201 A * | 2/2000 | Gordaninejad et al. | 188/267.1 |

* cited by examiner

CONTROLLABLE MEDIUM DEVICE AND APPARATUS UTILIZING SAME

FIELD OF THE INVENTION

The invention relates to the area of damping, resistance generating, and motion control devices. Specifically, it relates to devices employing a controllable medium for damping, resistance generating, and motion control.

BACKGROUND OF THE INVENTION

Dampers and shock-absorbers are known which use a hydraulic fluid as the working medium to create damping forces to control or minimize shock and/or vibration. Typically, the damping forces are generated by a pressures resisting movement between operative components of the damper or shock absorber. One class of these devices includes magnetorheological (MR) fluid devices. MR devices may be of the "rotary-acting" or "linear-acting" variety. Known MR devices include linear dampers, rotary brakes, and rotary clutches. Each MR device employs a Magnetorheological (MR) fluid comprised of soft-magnetic particles dispersed within a liquid carrier. Typical particles include carbonyl iron, and the like, having various shapes, but which are preferably spherical and have mean diameters of between about 0.1 $\mu$m to about 500 $\mu$m. The carrier fluids include low viscosity hydraulic oils, and the like. In operation, these MR fluids exhibit a thickening behavior (a rheology change) upon being exposed to a magnetic field. The higher the magnetic field strength in the fluid, the higher the damping/restraining force or torque that can be achieved within the MR device.

MR fluid devices are disclosed in U.S. patent application Ser. No. 08/304,005 entitled "Magnetorheological Fluid Devices And Process Of Controlling Force In Exercise Equipment Utilizing Same", U.S. patent application Ser. No. 08/613,704 entitled "Portable Controllable Fluid Rehabilitation Devices", U.S. application Ser. No. 08/674,371 entitled "Controllable Brake", U.S. patent application Ser. No. 08/674,179 entitled "Controllable Vibration Apparatus" and U.S. Pat. Nos. 5,547,049, 5,492,312, 5,398,917, 5,284,330, and 5,277,281, all of which are commonly assigned to the assignee of the present invention.

Known MR devices advantageously can provide controllable forces or torques, as the case may be, but, as currently designed, such devices are comparatively expensive to manufacture. These devices typically include a housing or chamber that contains a quantity magnetically controllable fluid, with a movable member, a piston or rotor, mounted for movement through the fluid in the housing. The housing and the movable member both include a magnetically permeable pole piece. A magnetic field generator produces a magnetic field across both pole pieces for directing the magnetic flux to desired regions of the controllable fluid. Such devices require precisely toleranced components, expensive seals, expensive bearings, and relatively large volumes of magnetically controllable fluid. The costs associated with such devices may be prohibitive to their use in certain applications, for example, washing machines and home exercise devices. Therefore, there is a long felt, and unmet, need for a simple and cost effective MR fluid device for providing variable forces and/or torques.

The foregoing illustrates limitations known to exist in present devices and methods. Thus, it is apparent that it would be advantageous to provide an alternative directed to overcoming one or more of the limitations set forth above. Accordingly, a suitable alternative is provided including features more fully disclosed hereinafter.

SUMMARY OF THE INVENTION

The present invention provides a controllable medium device which uses a vastly reduced quantity of controllable rheological medium as compared to prior art devices, and which eliminates the need for expensive seals, bearings, and precisely toleranced components. As a result, the cost to manufacture such devices is dramatically reduced.

According to the invention, a small amount of controllable medium, preferably in fluid form, is entirely contained in a working space between relatively movable members subjected to the magnetic field by a fluid-retaining means, for example, an absorbent matrix (preferably an open cell foam or the like) or a wicking member. The inventor herein discovered that an absorbent member can hold a sufficient amount of fluid to produce a significant rheological effect between a first pole member and a relatively movable second pole member. The invention may be incorporated in various physical embodiments such as linear dampers, rotary dampers such as brakes, and mountings and applications therefor.

In particular, the present invention is a magnetorheological medium device which comprises first and second members coupled for relative movement and having a working space therebetween, means for producing a magnetic field that acts on the first and second members and the working space, and a field controllable medium contained substantially entirely in the working space.

A working space is provided by spacing the first and second members using structural supporting means. In a piston and cylinder device, for example, a working space is provided by selecting a piston head to have an outer dimension that is smaller than an inner dimension of the cylinder by a predetermined amount. The difference in size provides the working space when the piston head is assembled in the cylinder. In a piston and cylinder device, the structural support to maintain the spacing may conveniently be provided by a fluid retaining material surrounding and preferably fixed to the piston head. In a disk brake device, the working space is provided by mounting the rotor and caliper yoke in such a way as to space apart the surface of the rotor and the inner surfaces of the calipers.

According to a preferred embodiment of the invention, a controllable fluid is contained in the working space by a material providing an absorbent matrix disposed in the working space. Absorbent matrix is used here to indicate a material that has the ability to pick up and hold a fluid by wicking or capillary action. In a particularly preferred embodiment, the absorbent matrix is a sponge-like material, for example, an open-celled or partly open-celled foam. Polyurethane foam and rubber foam are examples of particularly suitable materials. Foams made of other materials are also suitable, and examples include silicone rubber, polyamide, viton rubber, neoprene, loner rubber, melamine, a polyimide high temperature foam, and metal foams.

An absorbent matrix can also be formed of other material structures, such as an unwoven material, such as mineral wool, or a felt, for example, Nomex brand aramid fiber felt or a compressed carbon fiber felt. In addition, a woven fabric could be used, made from materials such as KEVLAR brand fiber, graphite, silica, NOMEX brand aramid fiber, polybenzimadazole, TEFLON brand fiber, and GORE-TEX brand fiber. Alternatively, a mesh material, such as a metal mesh, could be used.

Other structures that can contain a fluid, for example, brushes, flocked surface materials, wipers, and gaskets are also suitable.

The absorbent matrix need not entirely fill the working space, as long as the field controllable medium is contained in the working space. Thus, the absorbent matrix may be formed as a structure having a plurality of cavities, such as a honeycomb or other network structure, to contain the medium in the working space.

Alternatively, in a linear acting damper, the fluid retaining means can be disposed as dams or wipers at end regions of the working space, leaving an open center region, the dams sliding with a linearly moving member relative to a fixed member for retaining the controllable medium in the working space.

By containing an effective amount of controllable medium only in the working space of the device, no expensive seals are needed to contain the controllable medium as in the prior art.

It is another advantage of the invention that amount of controllable medium needed to accomplish the rheology-based resistance effect is dramatically reduced to only the amount contained in the working space.

Another advantage of the invention, is providing a linear damper that requires no seals or bearings.

Another advantage of the invention, is providing a linear damper that doesn't require precisely toleranced components, i.e., non-ground piston rods and loosely toleranced outer member tubes and pistons.

According to the invention, means for generating a field in the first and second member and the working space is mounted to either of the first or second members in proximity with the working space. For example, in a piston/cylinder damper, the generating means can be at least one coil circumferentially wrapped on the piston head. In a rotary damper, the generating means can be at least one coil mounted to a yoke having arms between which the rotor turns.

A damping device in accordance with the invention can be incorporated in a number of apparatuses where it previously was cost-prohibitive to use controllable dampers. For example, the dampers of the invention can be used in washing machines to control vibration during various cycles. A resistance device of the invention can also be incorporated in exercise devices, such as bicycles, step machines, and treadmills to provide variable resistance.

The above-mentioned and further features, advantages, and characteristics of the present invention will become apparent from the accompanying descriptions of the preferred embodiments and attached drawings.

BRIEF DESCRIPTION OF THE DRAWINGS

The accompanying drawings which form a part of the specification, illustrate several key embodiments of the present invention. The drawings and description together, serve to fully explain the invention. In the drawings.

DETAILED DESCRIPTION OF THE PREFERRED EMBODIMENTS

Figure 1:
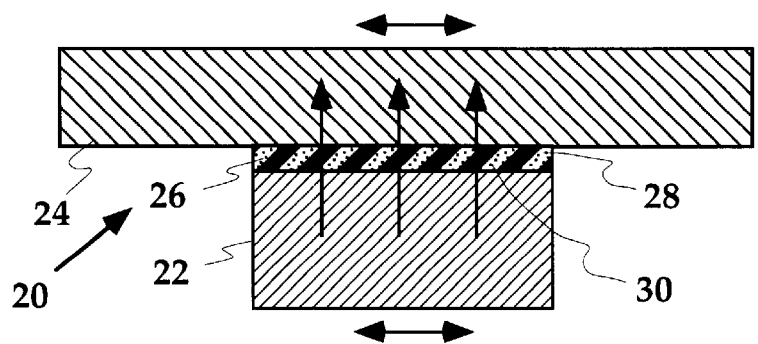
FIG. 1 is a schematic side view of a magnetorheological linear resistance device in accordance with the present invention.

Referring now to the Drawings where like numerals denote like elements, in FIG. 1, shown generally at 20, is a schematic illustration of a device for providing preferably controllable resistance between two relatively movable structures (not shown). The device 20 includes a first member 22 and a second member 24 that are disposed in spaced relation or coupled for relative movement along the mating surfaces. A working space 26 is provided between the coupled portions by spacing the mating surfaces apart. Means for generating a field, indicated by the vertical arrows, produces a field that preferably acts on the first member 22 and the second member 24 and (generally across) the working space 26.

According to the invention, the field generating means can be an electric field generator or a magnetic field generator. For reasons relating to cost, power requirements, and field strength, it is preferred to use a magnetic field generating means. The first 22 and second 24 members each preferably include magnetically permeable material (such as a soft magnetic steel), which can be done by forming each of the members 22, 24 entirely from such a material, or including such material as a component part or integrated portion of the member 22, 24. A field responsive controllable medium 28, such as a controllable fluid, compatible with the field generating means is contained in the working space 26 by fluid retaining means 30. Magnetorheological controllable fluids as contemplated for the present invention are disclosed in, for example, U.S. Pat. No. 5,382,373 to Carlson et al. and U.S. Pat. No. 5,578,238 to Weiss et al.

For use with an electric field generator (not illustrated), an electrical conducting material, such as aluminum, is incorporated in the first 22 and second 24 members, and is used with an ElectroRheological (ER) fluid.

The field generating means alters the rheology of the controllable medium 28 in proportion to the strength of the field. The controllable medium 28 becomes increasingly viscous with increasing field strength, and provides a shear force to resist movement between the members 22, 24. The members 22, 24 are preferably fixedly secured to relatively moveable structures (not shown) to provide resistance to movement therebetween.

The inventor has discovered that a significant shear force for resisting relative movement can be obtained with a small amount of controllable medium 28, such as MR fluid, contained in the working space between the movable members. Thus, a variety of relative movements, rotational, linear, pivoting, that include shear movement between two structural members can be controlled by a device according to the invention. By containing substantially the entire amount of controllable medium or fluid at the working space, the present invention avoids the need to provide a large quantity of medium or fluid, and the associated seals and containing devices of the prior art, and accordingly reduces the tight tolerances formerly needed on all components.

Any suitable means for containing the medium or fluid at the working space can be used. According to a preferred embodiment of the invention, means for containing the controllable medium in the working space comprises an absorbent matrix material, that is, a material that can take up and hold the controllable medium by wicking or capillary action. The absorbent matrix preferably provides a structure having open spaces for containing the medium, and the material forming the matrix may or may not be absorbent itself. A particularly preferred absorbent material is a sponge-like material, for example, an open-celled or partly open-celled foam. Examples of materials suitable for making a foam are polyurethane, rubber, silicone rubber, polyamide, neoprene, loner, melamine, polyimide high temperature foam, and metal foam. By way of example, if the absorbent material is, for example, a foam, it is desirable to have the foam compressed between about 30% and 50% from a resting state in its installed state.

In addition, other exemplary absorbent matrix materials include felts, including felts made of materials such as NOMEX brand aramid fiber, compressed carbon fiber, or other materials, loose weave fabrics, mineral wool, cloths made from graphite, silica, NOMEX brand aramid fiber, polybenzimadazole fiber, TEFLON brand fiber, and GORE-TEX brand fiber, fiberglass wicking, and woven brake or clutch lining material. Other materials and structures are also suitable, for example, a metal mesh, a brush, or a flocked surface material.

The medium or fluid retaining means 30 is preferably fixed to one of the relatively moving members to ensure that it remains disposed in the working space 26. According to a preferred embodiment, a fluid retaining means is adhesively bonded to one member, for example, by a pressure sensitive adhesive. A preferred material is a polyurethane foam having a pressure sensitive adhesive on one side. The foam may be readily attached to one member by the adhesive. Alternatively, the fluid retaining means can be shaped so that it is held in place by the structure of the member, for example, a tubular shaped foam material may be fitted on a piston head as a sleeve.

Figure 2:
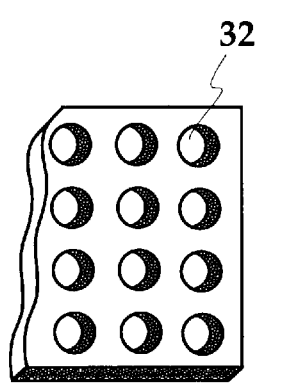
FIG. 2 is a partial isometric view of an absorbent matrix material for the resistive device.

The retaining means need not fill the working space. An absorbent matrix such as that illustrated in FIG. 2, having a plurality of cavities 32 for holding the controllable medium may be placed in the working space.

Figure 3:
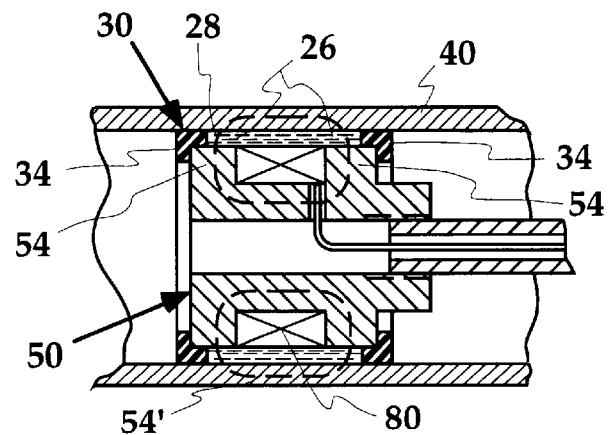
FIG. 3 is a cross sectional view of a damper having an alternative fluid retaining structure.

In a linearly acting damper, for example, a piston and cylinder arrangement as illustrated in FIG. 3, the medium or fluid retaining means 30 alternatively can be formed as dams 34 at the boundaries of the working space 26, either inside or outside the working space 26, to trap the medium or fluid in the space 26 in proximity to the magnetic poles 54, 54'. As may be understood, in a piston 50 and cylinder 40 arrangement, the working space 26 are defined between cylindrical portions of the of the piston 50, and localized portions of the inner wall of the cylinder 40. As the piston 50 slides in the cylinder 40, the working space 26 moves with the piston 50. The field generating means 80 is conveniently carried and mounted on the piston 50. The dams 34 slide with the piston head 50 as it slides relative to the cylinder 40 to retain controllable fluid 28 in the moving working space 26 and in proximity the field generating means. Thus, when the poles 54, 54' are energized, the controllable fluid 28 changes rheology in the space 26. The dams 34 can be formed of elastomer, felt, or foam materials, as is convenient. Alternatively, packing material or gasket material could be used to form the dams. Other structures that may occur to those skilled in the art could also be used.

As will be understood by those skilled in the art, any suitable fluid retaining means could be used in the embodiments described below, and the embodiments are not limited to the particular, preferred fluid retaining means described.

A controllable fluid made from a suspension of iron alloy particles suspended in a carrier, as disclosed in, for example, U.S. Pat. No. 5,382,373 to Carlson et al. and U.S. Pat. No. 5,578,238 Weiss et al. may be used in the present invention. Preferably, the controllable fluid for the present invention has the consistency of a grease or paste to aid in containing the fluid in the retaining means. One such grease is described in PCT/US 97/02743, entitled "Magnetorheological Fluid Seismic Damper."

The invention can be incorporated in a wide range of devices for resisting relative movement between members, including linear dampers, rotary dampers, resistance devices for exercise equipment, braking devices, and others, as will be understood from the following descriptions.

Figure 4:
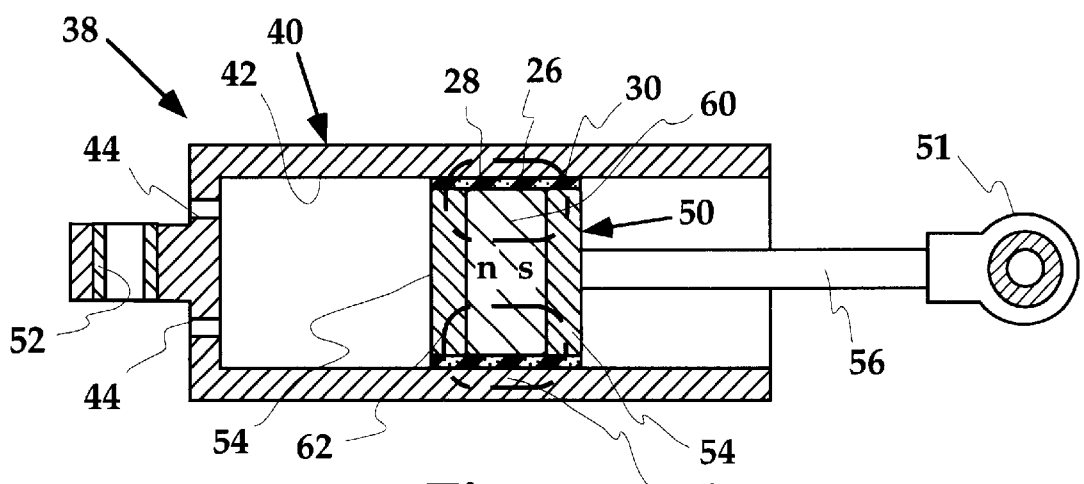
FIG. 4 is a cross sectional side view of a passive linear damper.

FIG. 4 illustrates a passive linear damper 38 in the form of a piston and cylinder arrangement. The damper of FIG. 4 includes a cylinder 40 and a piston 50 disposed in the cylinder for sliding movement. The piston 50 is preferably supported in the cylinder 40 by fluid retaining means, here, an absorbent matrix material 30, for example, an open cell foam. The absorbent matrix material 30 is wrapped around circumference of the piston 50, and is fastened to the piston 50 by pressure sensitive adhesive. The absorbent matrix material 30 spaces and supports the piston 50 from the inner surface 42 of the cylinder 40, thus providing a working space 26 between the piston 50 and cylinder 40. The absorbent matrix material 30 also eliminates the need for bearings to support the piston 50, which reduces the cost of the damper. A controllable fluid 28 is contained in the absorbent matrix material 30. To prevent an air spring effect, the cylinder 40 is preferably provided with vents 44 to relieve air pressure during movement of the piston 50.

The cylinder 40 and the piston 50 include pole pieces 54, 54', which are parts formed of soft-magnetic, magnetically permeable material. The cylinder 40 can be formed entirely out of a magnetically permeable metal or formed with an inner metallic sleeve as the pole piece 54'. The piston 50 may similarly be formed entirely out of metal or, as illustrated, to have end pole pieces 54 formed of magnetically permeable material.

In this embodiment, a permanent magnet 60 including axially directed north n and south s poles is carried on the piston 50 and produces a magnetic field, indicated by the flux lines 62. The magnetic field acts on the pole pieces 54 of the piston 50, the pole piece 54' of the adjacent portion of the cylinder 40, and the working space 26. By selecting the field strength of the magnet 60, the force resisting movement of the piston 50 in the cylinder 40 can be selected. Those skilled in the art will recognize that the magnetic field and controllable fluid will resist linear, that is sliding, movement of the piston, and also rotation of the piston about the shaft axis. A piston rod 56 is fixedly secured to the piston 50. Suitable means for connecting to the relatively moveable structures (not shown) are provided, such as rod end 51 and bushing 52.

Figure 5:
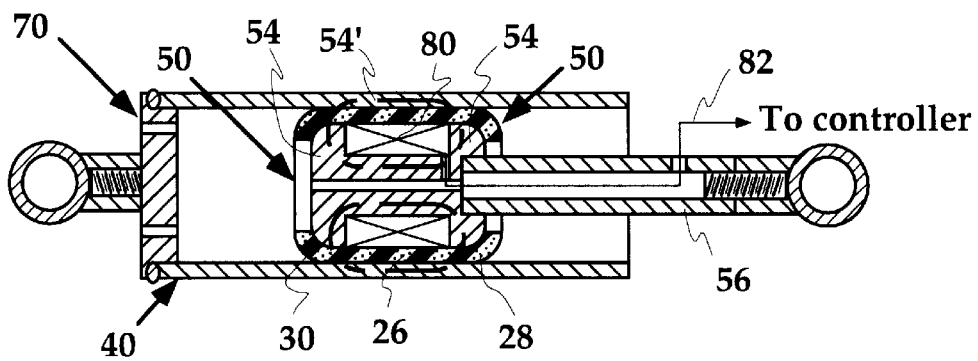
FIG. 5 is a cross-sectioned side view of a controllable linear damper.

A controllable linear damper 70 in the form of a piston and cylinder is illustrated in FIG. 5. The damper 70 includes a piston 50 disposed in a cylinder 40. Each of the piston 50 and the cylinder 40 includes a pole piece 54, 54', the cylinder 40 in this case being formed entirely of a magnetically permeable material, and the piston 50 having a core of magnetically permeable material. The piston head is wrapped with an absorbent matrix material 30 which functions as the means for containing a controllable fluid 28 in the working space 26. Magnetic field generating means in the form of a coil 80 is mounted on the piston 50, and is connected to a controller and power supply (not shown) by wires 82 (shown graphically as a single line) that preferably pass through a hollow interior of the piston rod 56. The resistive force produced can be varied by changing the magnetic field strength which is controlled by the amount of current supplied to the coil 80 by the controller (not shown). The controllable damper 70 may be adjusted from low resistance to high resistance to restrain relative movement between the piston 50 and the cylinder 40.

Figure 6:
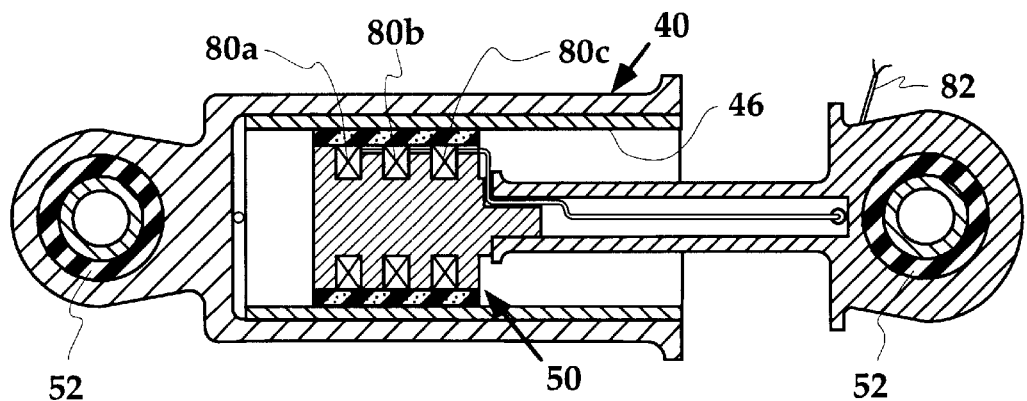
FIG. 6 illustrates an alternative embodiment of the damper of FIG. 5 having a multiple coil field generator, FIG. 7 a cross-sectioned side view of a linear rod damper embodiment of MR device.

FIG. 6 illustrates an alternative embodiment of the damper of FIG. 5, in which a plurality of coils 80a, 80b, and 80c are wound on the piston 50. The cylinder 40 includes a sleeve 46 of magnetically permeable material to serve as the cylinder pole piece. Multiple coils are advantageous in situations where the cylinder pole is subject to magnetic saturation, such as where the cylinder wall is thin or a sleeve 46, as illustrated, is used as the magnetically permeable member. As in the damper of FIG. 5, wires 82 connect the field generating coils 80a, 80b, and 80c to a controller. The coils 80a, 80b, and 80c are alternately wound so that the fields produced are additive. Elastomer bushings 52 may be added as the means to attach to the structural members (not shown), the elastomer helping to reduce the harshness in any control algorithm utilized.

Figure 7:
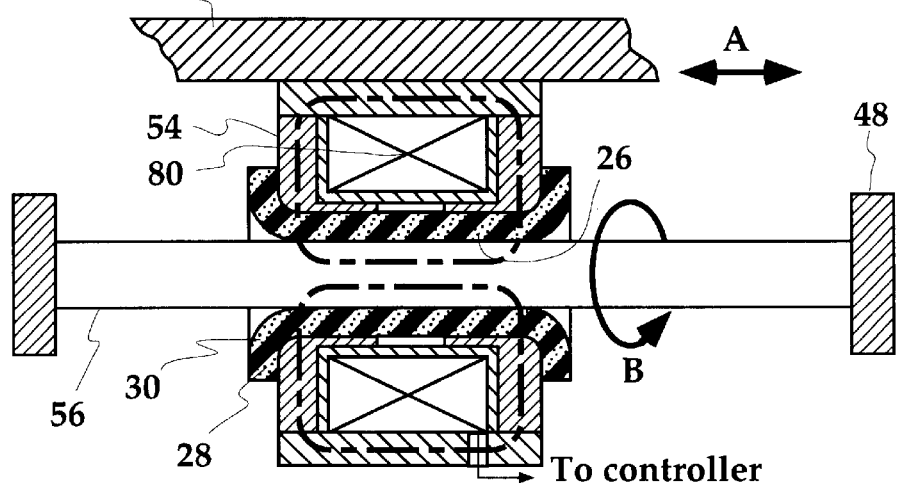

The device of FIG. 7 is useful for motion control or guide mechanisms, or in a braking device. Pole pieces 54 are supported on a shaft 56 by an absorbent matrix material 30 for sliding and/or rotational movement, as illustrated by arrows A and B, respectively. The absorbent matrix material 30 supports the pole pieces 54 relative to shaft 56 and at a distance to provide the working space 26. Thus, in this embodiment, no bearings are necessary to support relative movement of the pole pieces 54 relative to shaft 56. The pole pieces 54 may be part of a moving component 49 and the shaft 56 may be part of a fixed frame 48. Alternatively, the pole pieces 54 may be the fixed element. A controllable fluid medium 28 is contained in the absorbent matrix material 30. A coil 80 is circumferentially wound and generates a magnetic field acting on the shaft 56, the pole pieces 54 and the working space 26 as indicated by the dotted field lines shown.

Figure 8:
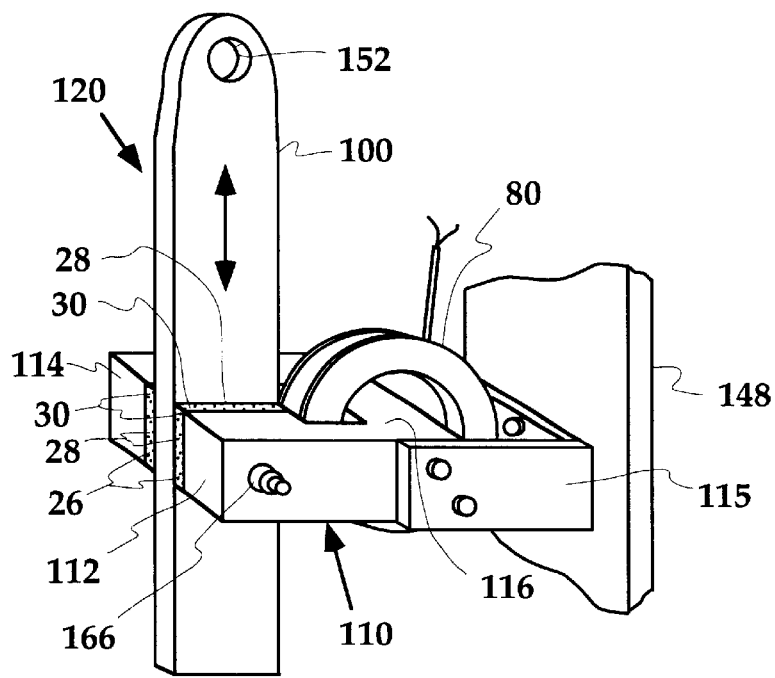
FIG. 8 is a perspective side view of a controllable linear damper having a movable strip and a stationary yoke.
Figure 9:
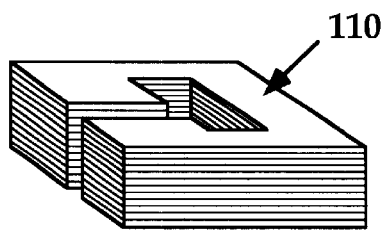
FIG. 9 is a perspective side view of an alternative yoke member for the device of FIG. 8.
Figure 14:
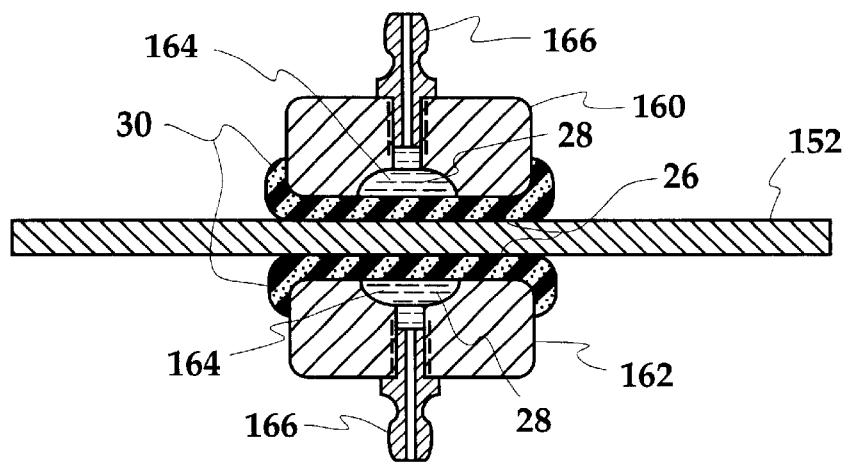
FIG. 14 illustrates a nipple arrangement for supplying or replenishing controllable medium to a device.

Other linear movement devices could advantageously incorporate the resistance device of the invention. FIG. 8 illustrates a device 120 in which a strip 100 is coupled for linear movement in a yoke member 110. The yoke 110 is C-shaped and includes two opposed jaws 112, 114 defining a working space 26 in which the strip 100 is disposed for sliding movement. Fluid retaining means 30, such as an absorbent matrix, is carried on the jaws 112, 114 in the working space 26 to hold the controllable fluid 28. A coil 80 is mounted on a shoulder 116 of the yoke 110 between the jaws 112, 114 to generate a magnetic field that acts on the yoke jaws 112, 114, and across the strip 100 and the working space 26. Fittings 166 as shown in FIG. 14 allow controllable fluid to be replenished in the working space 26 and absorbent matrix 30. As shown in FIG. 9, the yoke 110 may be alternatively formed from a stack of magnetically permeable layers laminated together. The strip 100 and yoke 110 are preferably formed of a soft magnetic ferrous metals. Bracket 115 attaches the yoke 110 to a stationary structure 148. Means such as bolt hole 152 shown are used for attaching strip 100 to a movable structure (not shown).

Figure 10A:
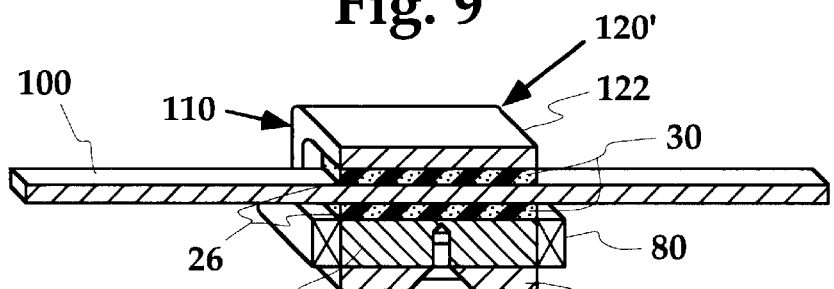
FIG. 10a is a perspective cross-sectioned view from the front of an alternative linear strip damper or brake.
Figure 10B:
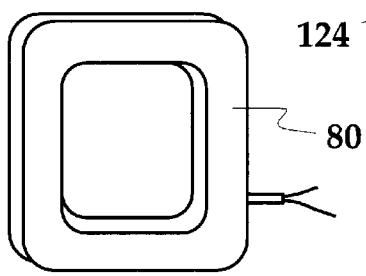
FIG. 10b illustrates a field generating coil for the linear strip damper of FIG. 10a, FIG. 10c is a pole piece used in connection with the linear strip damper of FIG. 10a, FIG. 11 is a front view of a brake device for a continuous belt.
Figure 10C:
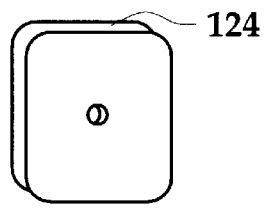

An alternative linear strip device 120' is illustrated in FIG. 10a. In this embodiment, a strip 100 is disposed between the opposed walls 122 of a U-shaped yoke 110. Fluid medium retaining means 30 is disposed in the working space 26 between the walls 122 and the strip 100. In this embodiment, a field generating means in the form of a square-shaped coil 80, illustrated separately in FIG. 10b, is disposed to surround a magnetically soft pole piece 124, illustrated separately in FIG. 10c, mounted between the walls.

Figure 11:
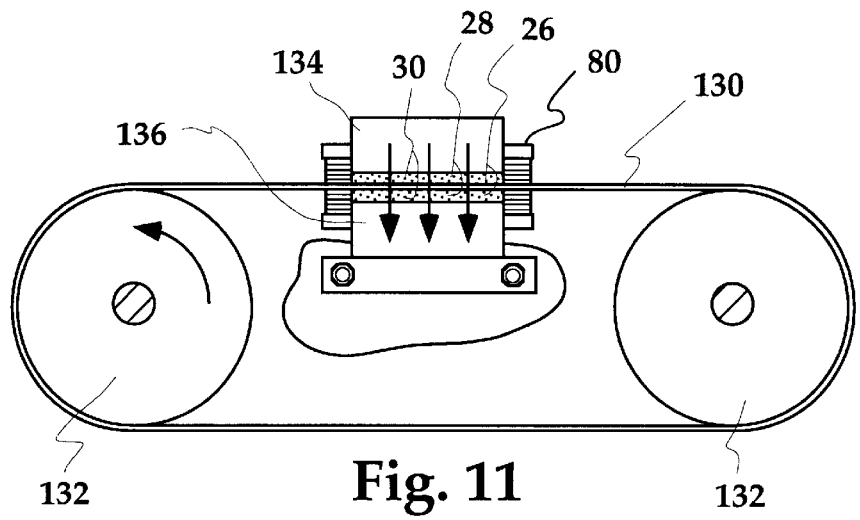

A linear acting brake is illustrated in FIG. 11. In this device an endless metal belt 130, for example, a drive belt, of a soft magnetic/magnetically permeable material is driven by one or more of the rollers 132. The belt 130 passes through working space 26 provided between an upper pole 134 and a lower pole 136 of the brake. An absorbent material 30 is disposed in the working space 26 on both sides of the belt 130. Field generating means 80 (shown in back of the belt 130) is provided as a coil that surrounds a shoulder member (not shown) interconnecting the poles 134, 136. The field generating means 80 creates a magnetic field (indicated by the arrows) that acts on the plates, the belt 130, and controllable fluid 28 in the working space 26. The device acts at the maximum radius of the rollers 132, which provides very effective braking. The device could also readily be used as a brake for a metal cable or wire, or other like drive member, as will readily understood, by replacing the endless belt with a cable, wire or other like drive member. Notably, in the case of a metal belt the brake only need act on a small lateral (into and out of the paper) portion of the belt 130, thus leaving the majority of the belt free from a medium film. Appropriate shrouding may be added to cover the portion of belt including a film on its surface.

Figure 12:
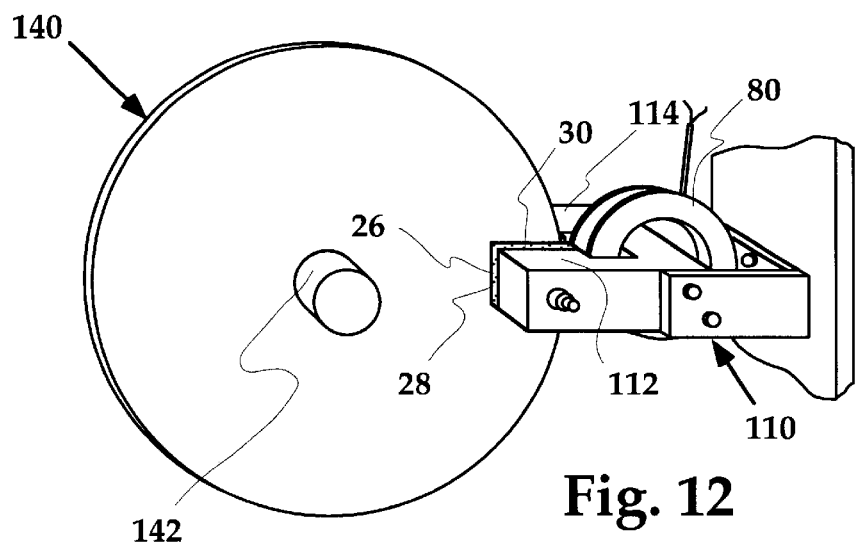
FIG. 12 is a side perspective view of a brake device for a rotor disc.

FIG. 12 illustrates a rotary braking device. A rotor element 140, which could be a flywheel of an exercise machine, for example a stationary bicycle (see FIG. 26), is mounted for rotation on a shaft 142. The rotor element 140 is preferably formed entirely of a magnetically permeable material. A yoke 110, similar to that shown and described in FIG. 8 or 9, is mounted so that the outer portion of the rotor element 140 passes between the jaws 112, 114 of the yoke 110. The fluid retaining means 30, in this embodiment formed of an absorbent matrix material, is carried in a working space 26 between the jaws 112, 114 to retain the controllable fluid 28 in the working space. A coil 80 for generating a magnetic field is mounted on the yoke 110. The device may be variably activated to provide adjustable resistance to rotation of the rotor 140.

The device of FIG. 12 may be used for large diameter rotors. In addition, the rotor 140 may be formed with sufficient inertial mass to act as a flywheel, as may be used in an exercise bicycle, ski machine, or step machine. Additional brake devices may be provided to increase the braking force.

Figure 13:
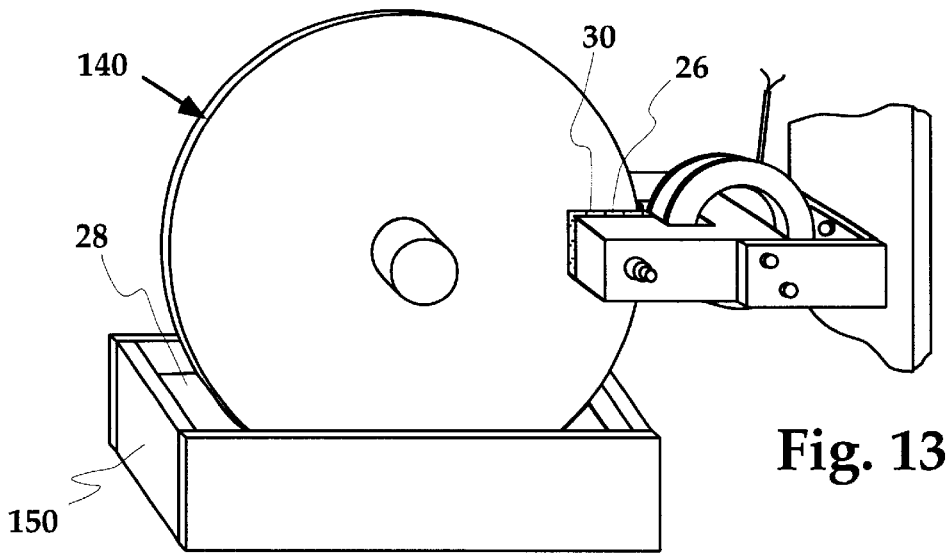
FIG. 13 illustrates a device for replenishing controllable medium to a device as in FIG. 12.

The controllable fluid 28 is retained, for the most part, in the absorbent matrix material 30, and a small amount will form a thin layer on the surface of the contacting outer portion of the rotor element 140. Under normal conditions, the controllable fluid 28 is not consumed, and spreading of a thin layer on the rotor 140 presents no problem. Should the use conditions require that the controllable fluid 28 be replenished, for example, at high rotation speed where the fluid film on the rotor 140 is spun off by centrifugal effects, a device as shown in FIG. 13 provides a controllable fluid replenishment source 150, a pan container, in communication with the outer portion of the rotor element 140. As the rotor element 140 turns through the pan 150, controllable fluid is picked up on the outer portion of the rotor element 140 and carried into the working space 26 to be absorbed by the absorbent matrix material 30. Appropriate shrouding may be used.

FIG. 14 illustrates an alternative embodiment for supplying and replenishing a controllable fluid medium 28 to the working spaces 26. A moving element 152 (plate, strip, disc, etc.) is positioned in working spaces 26 between two pole piece jaws 160, 162 which carry magnetic flux therein. Fluid retaining means 30 is disposed in the working spaces 26. This structure can be included within a linear or rotary acting device, as will be readily understood. The pole jaws 160, 162 have passages 164 that communicate with the working space 26, and fittings 166 (similar to grease fittings) are mounted to the passages 164 to allow controllable fluid 28 to be introduced to the working space 26. Although not shown, the fittings 166 may include means to prevent escape of the medium from the fitting 166 once filled, i.e., spring-loaded ball mechanisms or caps.

Figure 15:
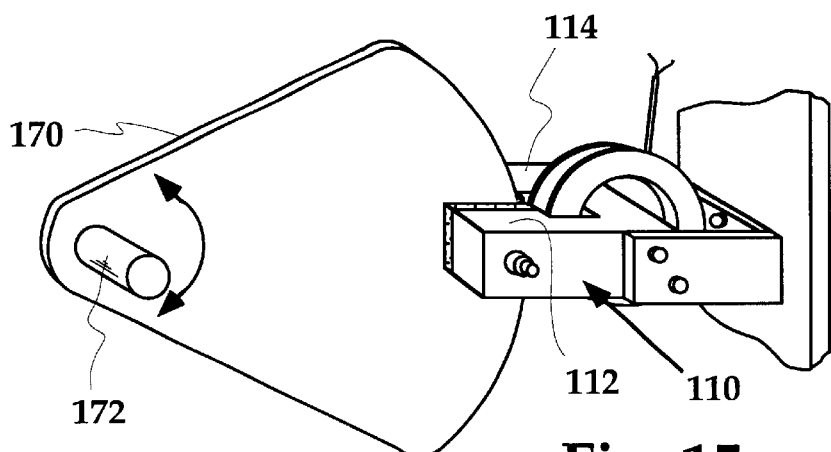
FIG. 15 is a perspective view from the side of a pivoting damper arrangement.

The yoke 110 as previously described can also be used for other apparatuses, for example, a reciprocating pivot apparatus as shown in FIG. 15, in which a pivoting element 170 mounted with a shaft 172 has an outer portion that moves between the jaws 112, 114 of the yoke 110. Shaft 172 is interconnected to a machine (not shown). Other applications will be apparent to those of ordinary skill in the art.

Figure 16:
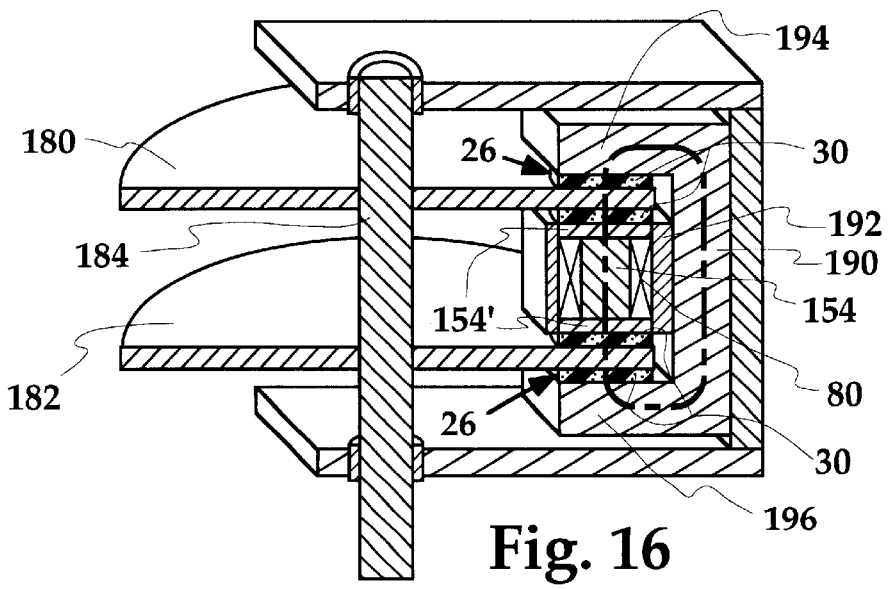
FIG. 16 is a perspective, cross-sectioned view of a two rotor brake system.

FIG. 16 illustrates, in perspective sectional view, a device in which two parallel disc-like rotors 180, 182 are mounted for rotation with a shaft 184. The shaft 184 being rotatably attached to other rotating componentry of a machine (not shown). A U-shaped pole bracket 190 having a center spacing piece 192 is positioned adjacent to and straddling a radially outer portion of the rotors 180, 182. Multiple working spaces 26 are provided between legs 194, 196 of the bracket and the center piece 192. The rotors 180, 182 are positioned so that a portion rotates through the working spaces 26. Fluid retaining means 30 includes an absorbent material disposed in the working spaces 26. Field generating means includes a single annular coil 80 mounted in the center piece 192, which produced a field which acts on the pole bracket 190 and the working spaces 26. A puck-shaped center pole 154 having disc-like end poles 154' in contact therewith focus the magnetic field across the working spaces 26.

Figure 17:
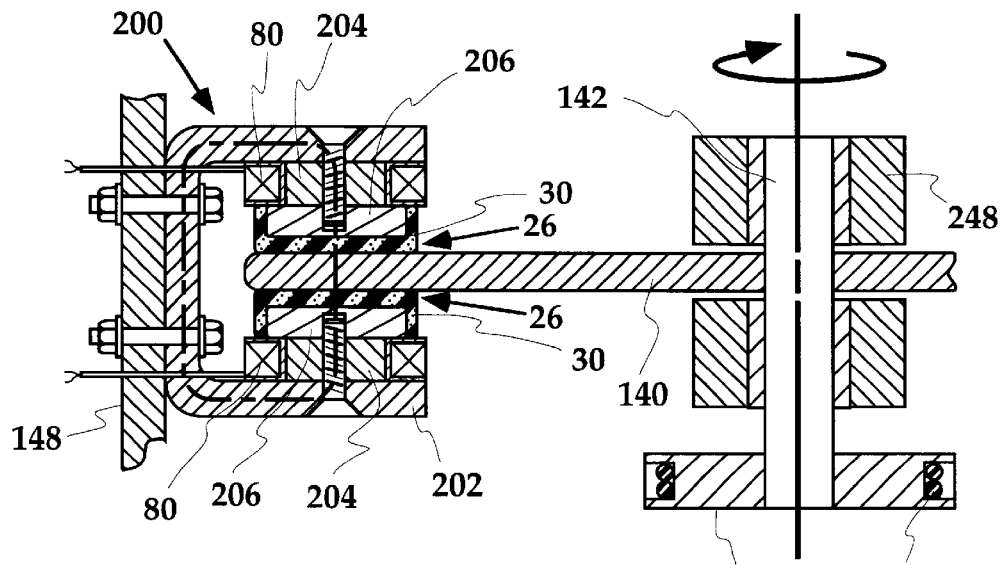
FIG. 17 is an alternative structure for the brake elements with a rotor.
Figure 18:
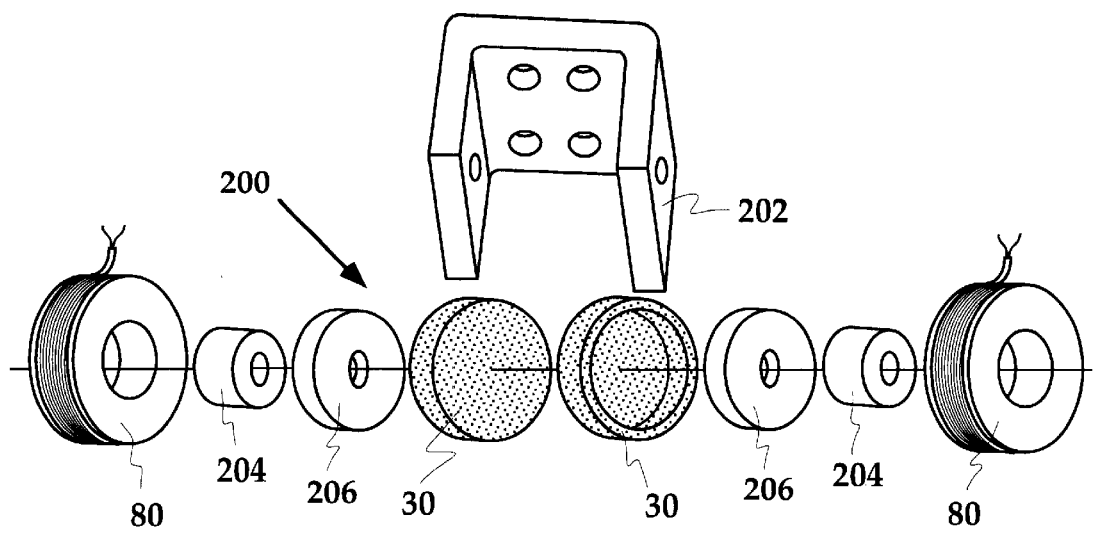
FIG. 18 is an exploded view of the brake elements of FIG. 17.

FIG. 17 and FIG. 18 illustrate another braking device 200. FIG. 17 is a sectional view of a rotor 140 mounted for rotation with a shaft 142. Shaft 142 being rotatably mounted relative to stationary frame 248. Rigidly connected to shaft 142 is pulley 265. Pulley 265 is interconnected to a machine (not shown), such as an exercise machine, in this embodiment by cable 267 doubled about pulley 265. The braking device 200, shown in exploded view in FIG. 18, includes a U-shaped pole bracket 202 that defines a space for receiving the rotor 140. Mounted to both inner surfaces of the legs of the pole bracket 202 are annular wound coils 80, soft magnetic puck-shaped core 204 which supports the coils 80, disc-shaped pole pieces 206 and a fluid retaining member 30, such as a molded foam absorber. Each of the coils 80 generates a field that acts on the pole bracket 202, pole pieces 206, cores 204, and fluid retaining member 30 and across the working spaces 26. The coils 80 are wound in the same directions so that the generated magnetic fields are aligned. The approximate magnetic field lines are illustrated by the dotted line in FIG. 17.

Figure 19:
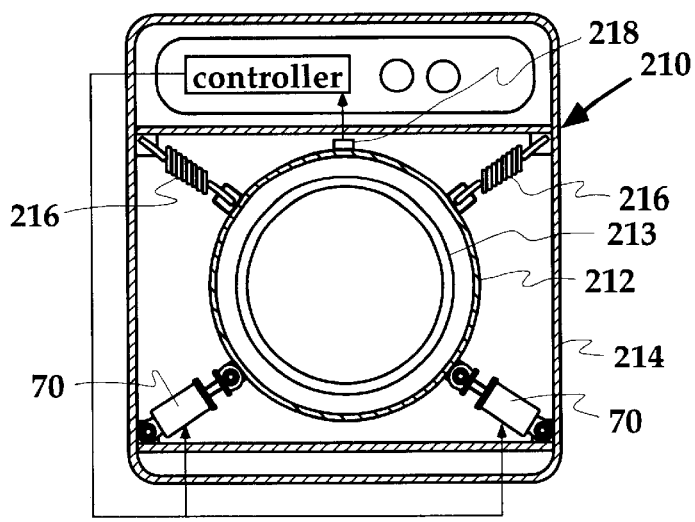
FIG. 19 is a front sectional view of a front loading washing machine including controllable dampers.

One particularly advantageous application for a linear damper of the invention is in washing machines. FIG. 19 illustrates controllable linear dampers 70, such as those described with reference to FIG. 6, mounted in a front loading washing machine 210 as components of the suspension and damping system. The front loading machine 210 has a horizontally-mounted drum 212 including a rotational portion 213 rotationally fixed and drivable relative to drum 212 by a motor (not shown). The drum 212 (and rotational portion 213) are flexibly suspended relative to a cabinet 214 by flexible springs 216. Dampers 70 provide control of radial vibrations of the drum 212.

Figure 22:
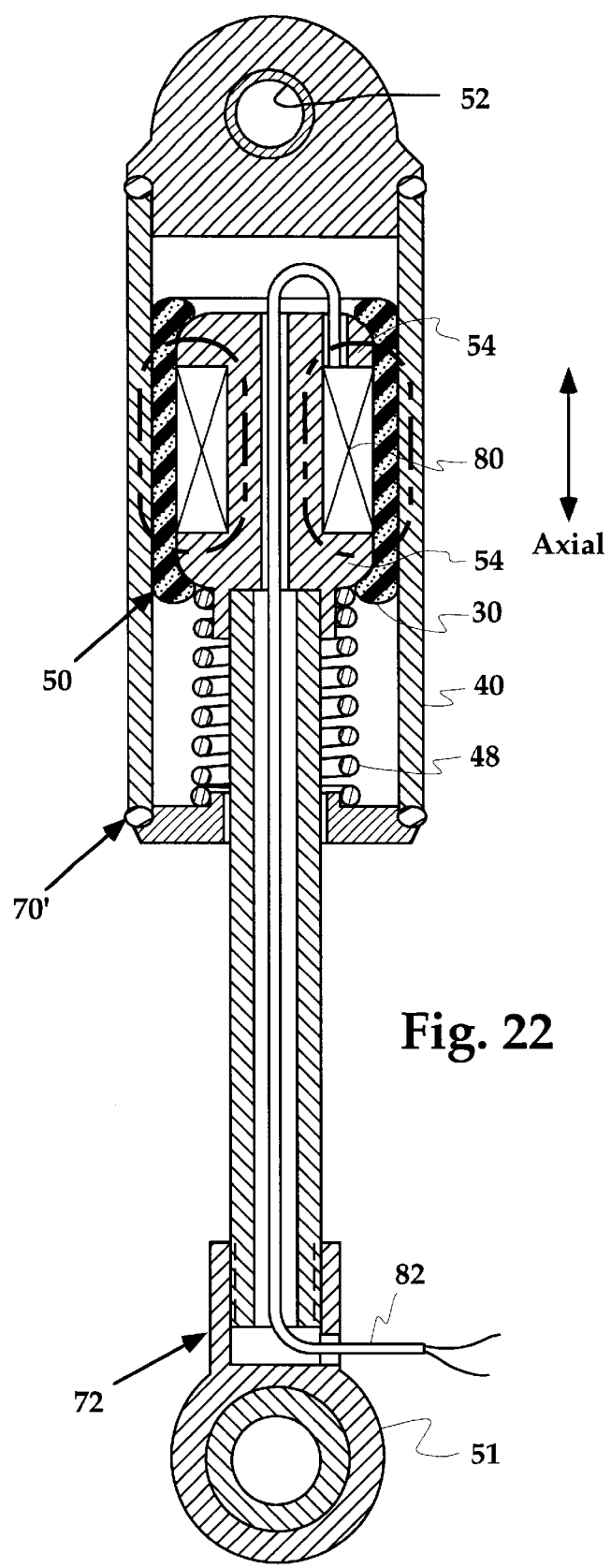
FIG. 22 is a side sectional view of a damper with an integrated spring.
Figure 23:
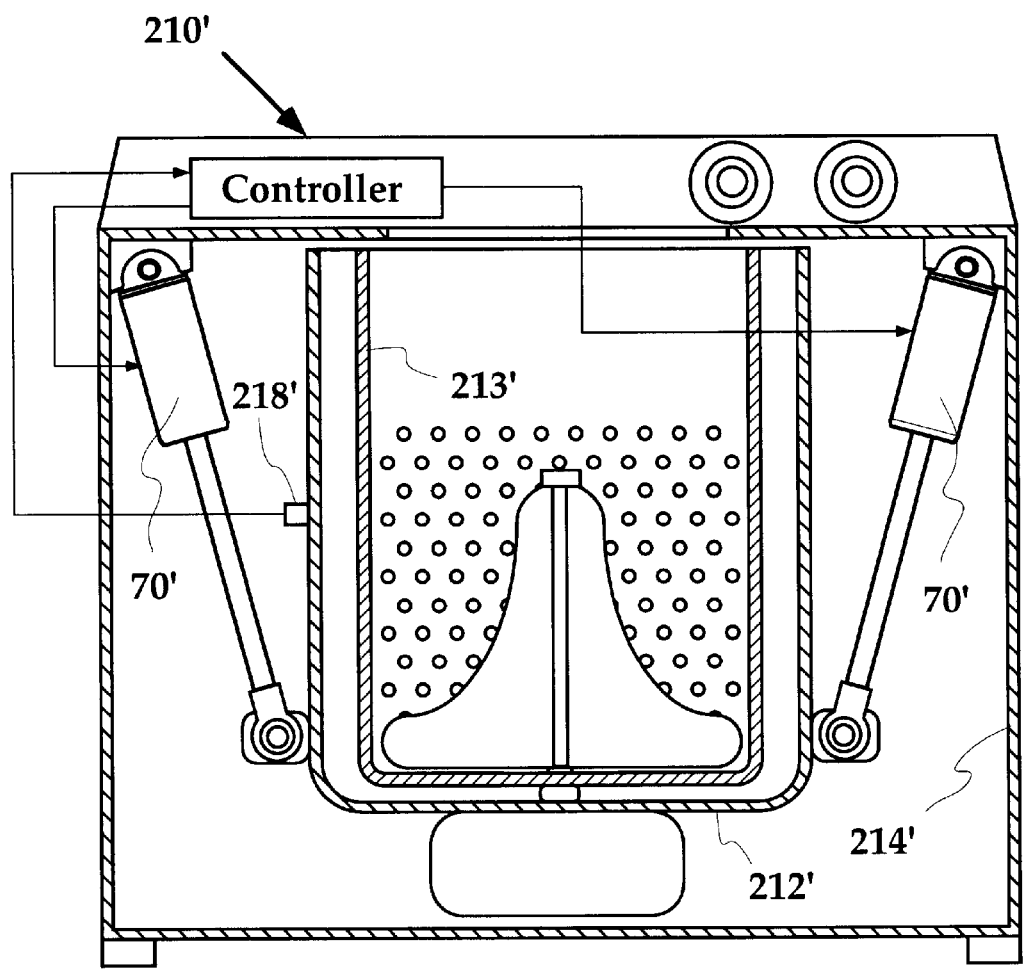
FIG. 23 is a side sectional view of a top loading washing machine include a damper with an integrated spring.

Controllable dampers according to the invention can be used in top-loading washing machines also to superior advantage, as illustrated in FIG. 23. A damper 70' with an integrated spring 48, such as a coil spring, is illustrated in sectional view in FIG. 22. The damper 70' is similar to that shown in FIG. 6, and includes a soft magnetic cylinder 40 in which is mounted a piston 50 for relative axial sliding movement. The piston 50 carries a circumferentially wound annular coil 80, soft magnetic piston head including poles 54, and a fluid retaining absorbent matrix material 30, such as a open-celled polyurethane foam is wrapped around the piston head. The spring 48 acts between the piston 50 and the cylinder 40 to provide vertical and radial support to the drum 212' (FIG. 23). Suitable means for securing to the drum 212' and cabinet 214' are provided such as rod end 51 and bushing 52.

FIG. 23 illustrates a plurality (preferably four) of the dampers 70' of FIG. 22 mounted in a top-loading washing machine 220. Dampers 70' including integral springs 48 are used to suspend the drum 212' from the washing machine cabinet 214'.

Figure 20:
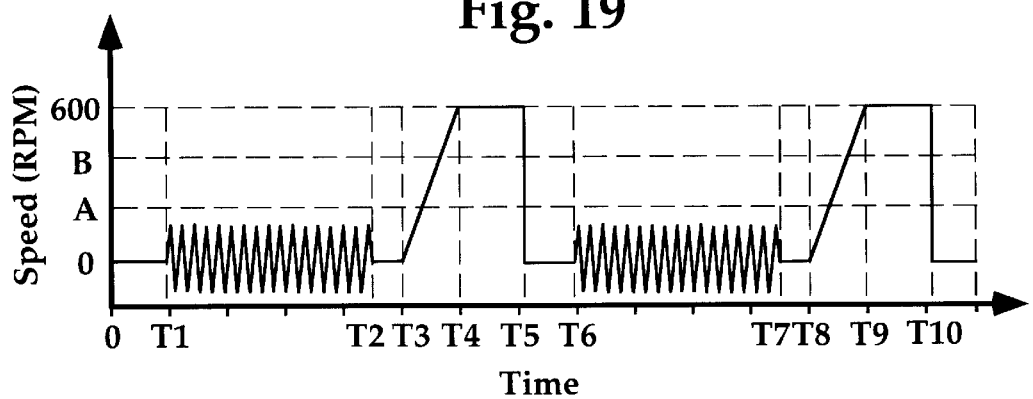
FIG. 20 is a graph of rotation speed of a washing machine tub during a washing cycle.
Figure 21:
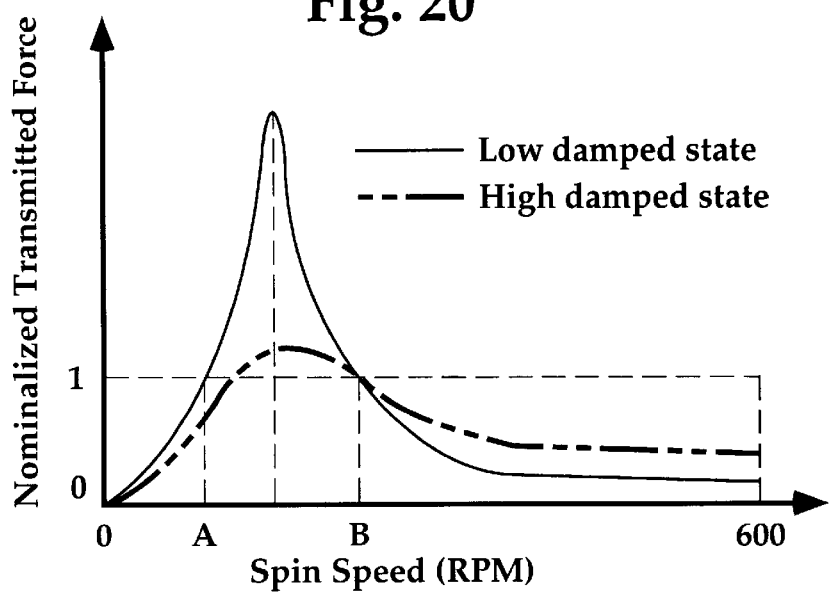
FIG. 21 is a graph of transmitted forces from a washing machine tub during a spin cycle.

Controllable dampers (ex. 70, 70') allow for adjusting the damping of the washing machine system to the different washing cycles. A typical wash cycle for a front loading machine is illustrated in FIG. 20 in terms of drum rotational speed in Revolutions Per Minute (RPM) over time. The cycle from T1 to T2 represents an agitation/wash cycle in which the rotating member 213, 213' executes reciprocal rotations. As the rotation accelerates into the spin cycle, represented by the period T3 to T4, the drum assembly 213, 213' passes through a resonance condition, which is shown in FIG. 21 between speed points A and B. By activating the damper 70, 70' during this acceleration period T3 to T4, damping can be imparted to the system and the transmitted force can be reduced. The washing machine cycle includes a second agitation T6 to T7 during the rinse cycle, and a second spin T9 to T10, which includes a second resonance condition during the associated acceleration T8 to T9. The damper 70, 70' would be activated during this time also. The damper 70, 70' is also preferably used at the end of the spin cycles when the drum decelerates through the resonance condition.

From FIG. 21, it can be seen that while increased damping is advantageous during the resonance condition between spin speeds A and B, increased damping will cause more force to be transmitted after the drum reaches spin speed than will low damping. Thus, the controllable dampers are preferably turned off after the drum leaves the resonance condition. The system of the invention advantageously allows damping to be adjusted for minimal force transmission throughout the washing machine cycle, which is a vast improvement over passive systems, in which a single, constant damping value must be chosen for all conditions.

Control of the dampers 70, 70' may be through a timer coordinated with the washing machine control timer, or through a speed sensor monitoring the drum rotation and set to activate the dampers 70, 70' at predetermined speeds, or through a vibration sensor 218, 218' (FIGS. 19, 23), for example, an accelerometer, monitoring drum vibration. Alternatively, vibration in the cabinet 214, 214' may be monitored.

Figure 24:
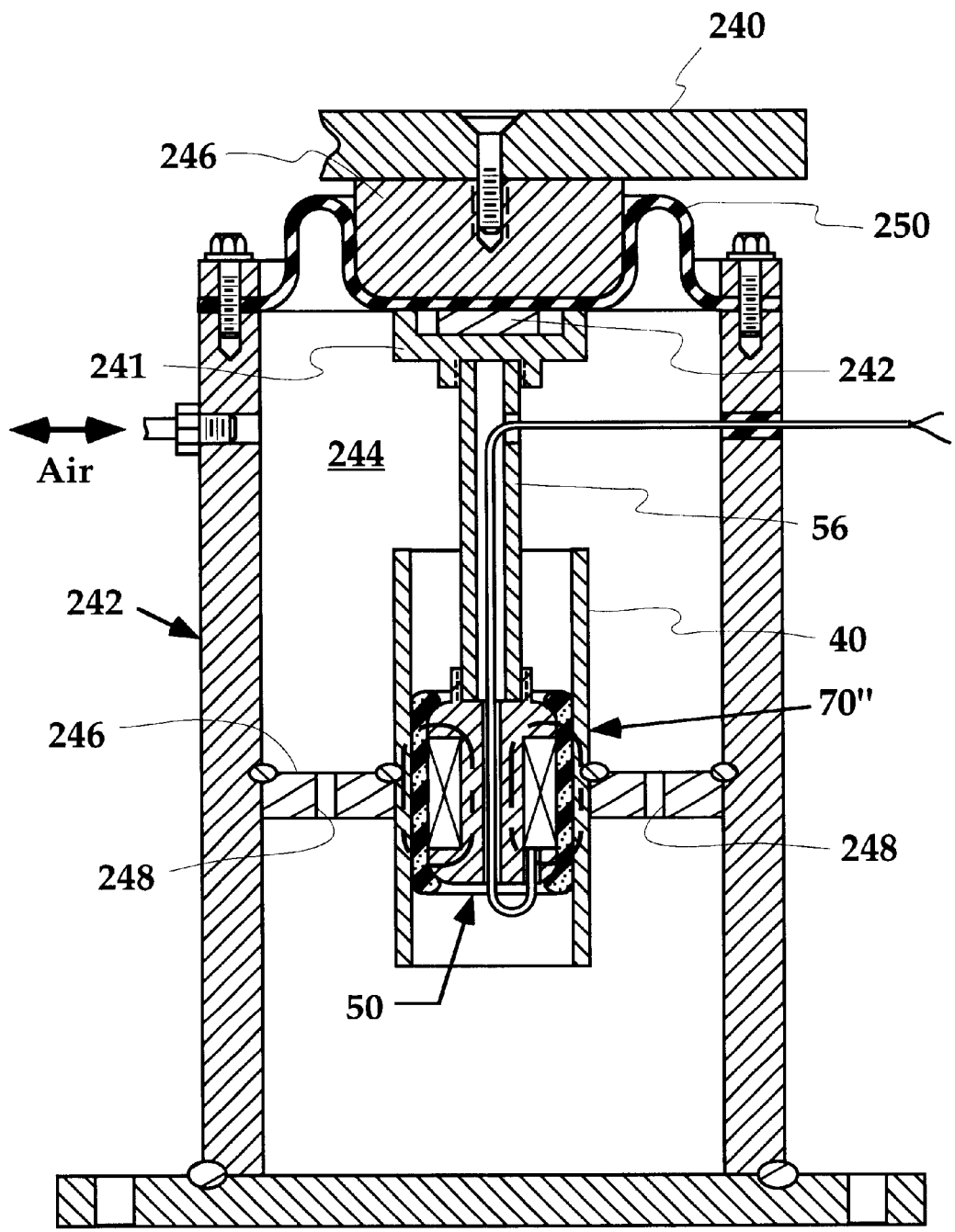
FIG. 24 is a side sectional view of a damper incorporated in an air spring supported leveling table for providing vertical damping.

FIG. 24 illustrates another application for damper in accordance with the invention, in a air-spring leveling table. A table 240 is illustrated in part, and one supporting leg 242 (one of four) of the table is shown in the figure. The leg 242 encloses an air chamber 244 divided by a wall 246 having vents 248. A damper 70" includes a soft magnetic cylinder 40 mounted to the wall 246 by weldments or the like, and a piston 50 having a rod 56 connected to the table 240. A bellows or rolling diaphragm 250 closes the upper portion of the chamber 244 and allows the table 240 to be supported and levitated by the air in the chamber 244. The rod 56 is connected to pole 241 having permanent magnet 242 secured thereto. A field produced by the magnet 242 causes the pole 241 to be attracted to the table piston 246 made form a ferromagnetic material. This avoids having to cut a hole in bellows 250.

The damper 70" helps control the motion of the table 240 when air is added to or removed from the chamber 244, by quickly damping the transient motions which cause the table 240 to oscillate.

Figure 25:
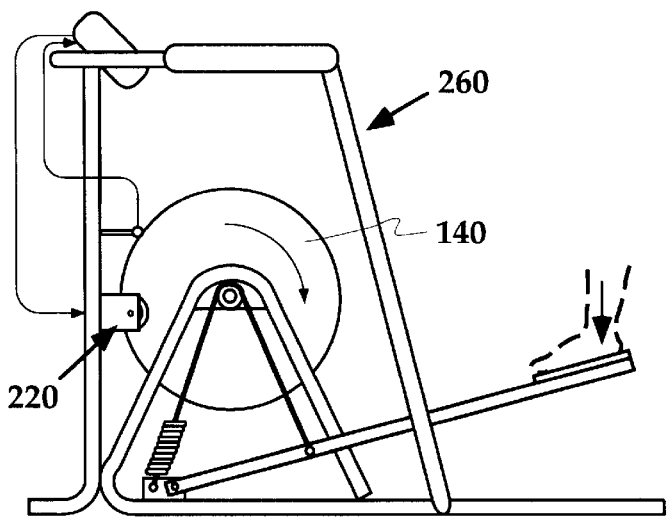
FIG. 25 is a side view of a step machine incorporating a resistance device.

Dampers and resistance devices in accordance with the invention can also be advantageously incorporated in exercise apparatus, as previously mentioned. FIG. 25 shows a simplified step machine 260 which includes a flywheel 140 and a resistance device 220 as described in connection with FIGS. 12, 16, or FIG. 17. The resistance device 220 may be controlled to adjust the resistance to rotation of the flywheel according to the user's preference. The device 220 according to the invention can generate high torque with a relatively small flywheel.

Figure 26:
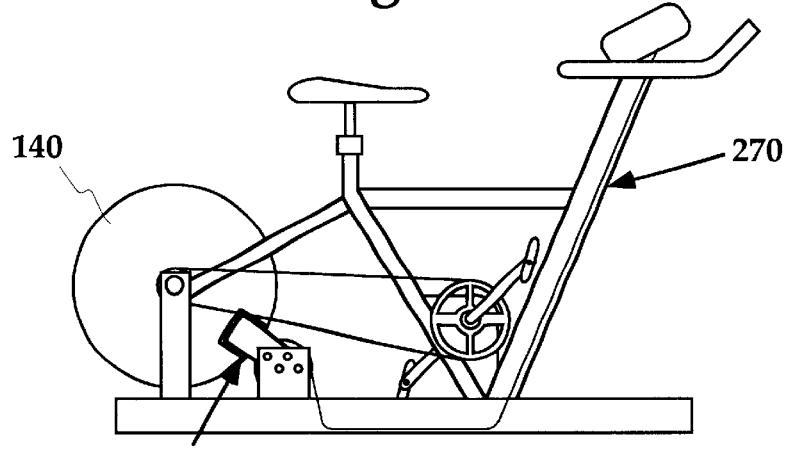
FIG. 26 is a side view of a stationary exercise bicycle incorporating a resistance device.

A similar rotary resistance device 220', such as described in connection with FIGS. 12, 16 and 17, can be mounted in an exercise bicycle 270, shown in FIG. 26. The resistance device 220' is mounted on the bicycle flywheel 140.

Figure 27:
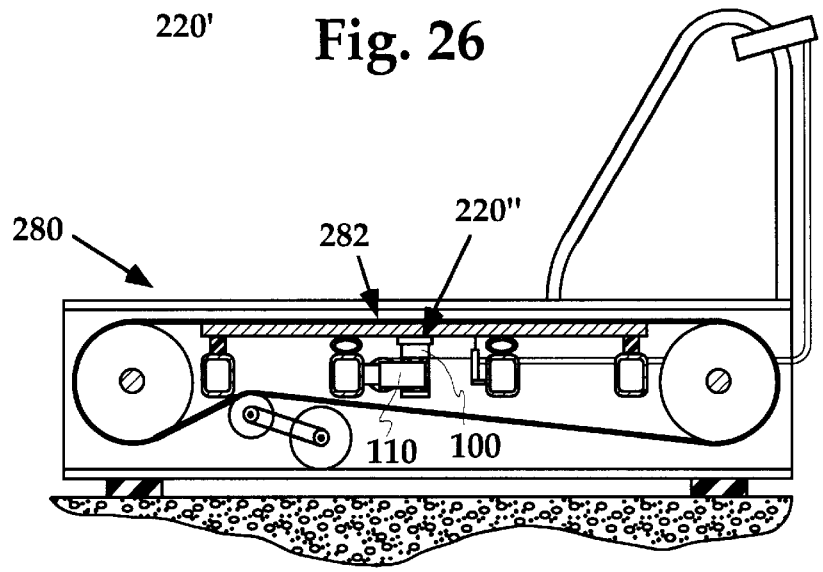
FIG. 27 is a side sectional view of a treadmill having a damper in accordance with the invention to control the impact conditions at the deck.

FIG. 27 shows a treadmill 280 having a damper 220" including a linear strip 100 and a yoke 110 mounted between the deck 282 and frame. Alternatively, a linear piston and cylinder damper as in FIG. 5, 6, or 22 can be used. The damper 220" can be controlled to provide a stiffer or softer running surface. For example, for slow running, that is, low foot strike frequency, a runner may prefer a softer, springier surface, and for fast running, a stiffer surface. The damper can also adjust the damping of the deck surface 282 for the weight of the user, to increase damping for heavier users and decrease it for lighter weight users.

Figure 28:
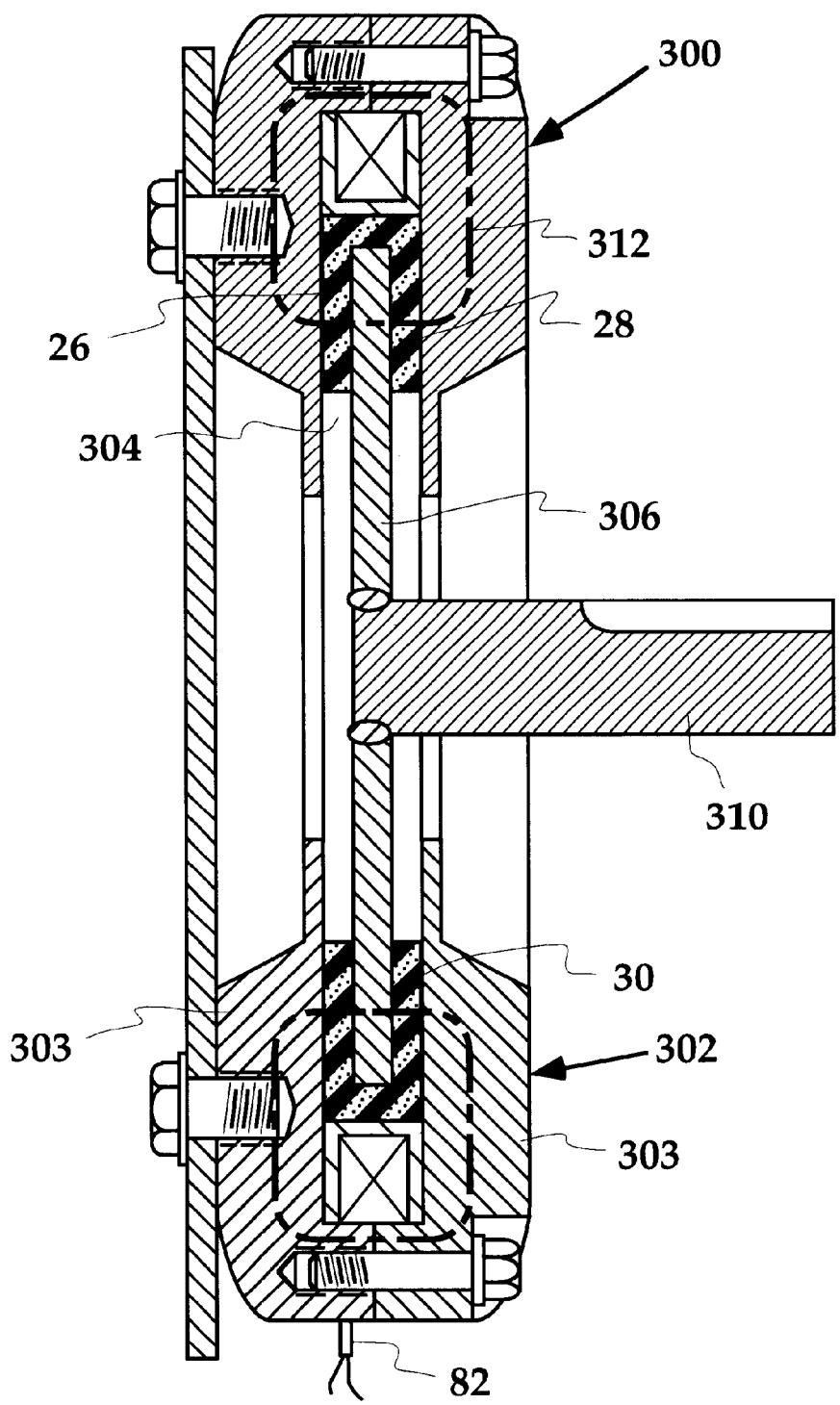
FIG. 28 is a side sectional view of a rotary brake in accordance with the invention.

FIG. 28 illustrates a rotary brake 300 in accordance with the invention. The brake 300 includes a fixed member, or stator 302, which forms an outer member. The stator 302 is formed of magnetically permeable material to act as a pole piece, and includes an interior space 304. A disc-shaped rotor 306 is disposed in the interior space 304, and is rigidly connected to a shaft 310 for rotation in the interior space 304. The rotor 306 is spaced from the inner surfaces of the stator 302 that define the interior space 304, which provides a working space 26 between the stator 302 and the rotor 306. An absorbent material 30 is disposed in the working space 26 to surround the radially outer portion of the rotor 306. A controllable medium 28 is contained by the absorbent material 30. A circumferentially wound field generating coil 80 is mounted between halves 303 of the stator 302 and preferably radially surrounds the rotor 306. The coil 80 is connected by wires 82 to a controller and power source (not shown).

As shown by the field lines 312, the coil 80 produces a field that acts on the stator 302, the rotor 306 and across the working space 26. Activation of the field causes resistance to rotation of the rotor 306. The absorbent material 30 eliminates the need to seal the interior space 304 of the stator. Further, no bearings are required.

In summary, it should be apparent from the foregoing that the present invention comprises a novel controllable device (either rotary or linear acting) which includes a controllable medium retaining means for holding medium (ex. a magnetically controllable fluid) in a working space between relatively moving components. The invention provides controllable devices that are simpler to design and manufacture, and less costly, than prior devices.

While several embodiments including the preferred embodiment of the present invention have been described in detail, various modifications, alterations, changes, and adaptations to the aforementioned may be made without departing from the spirit and scope of the present invention defined in the appended claims. It is intended that all such modifications, alterations, and changes be considered part of the present invention.

What is claimed is:

1. A controllable device, comprising:
   (a) a first member and a second member the first and second members arranged for relative movement with a moveable working space defined therebetween;
   (b) means for producing a field which acts on said working space;
   (c) absorbent means disposed in said working space, and being moveable with said working space; and
   (d) a quantity of a field controllable medium fixedly contained substantially entirely within said absorbent means, said field controllable medium having a rheology that is changed in response to being energized by a field to provide resistance forces between said first member and second member when the first and second members are moved relative to each other.

2. A controllable device as claimed in claim 1, wherein said absorbent means is slidable relative to one of said first and second members.

3. The controllable device as claimed in claim 1, wherein said means for producing a field is a magnetic field generator.

4. The controllable device as claimed in claim 3, wherein said means for producing a field includes at least one coil.

5. The controllable device as claimed in claim 4, wherein said at least one coil is further comprised of a plurality of coils.

6. The controllable device as claimed in claim 1, wherein the means for producing a field is a permanent magnet.

7. The controllable device as claimed in claim 1, wherein said absorbent means is compressed between about 30% and 50% from a resting state.

8. The controllable device as claimed in claim 1, wherein said absorbent means is an open celled foam.

9. The controllable device as claimed in claim 8, wherein said open celled foam is manufactured from a polyurethane material.

10. The controllable device as claimed in claim 1, wherein said absorbent means is formed as a matrix structure having open spaces for retaining said medium.

11. The controllable device as claimed in claim 1, wherein said device is a linear damper, said first member having a first pole piece and second member having a second pole piece, said first and second members being arranged for relative linear movement along a single axis, and wherein said means for generating a field acts on said first and second pole pieces.

12. The controllable device as claimed in claim 11, wherein at least one of the first and second members are also arranged for relative rotation about the single axis.

13. The controllable device as claimed in claim 11, wherein said first member includes a piston head and second member includes a cylinder, the piston head being disposed in the cylinder for linear sliding movement, said controllable medium being retained in the working space between the piston head and an inner surface of the cylinder, and wherein said means for generating a field is carried on the piston head.

14. The controllable device as claimed in claim 13, wherein said means for generating a field includes at least one coil.

15. The controllable device as claimed in claim 1, wherein said device is a linear damper interconnected between a tub and a body of a washing machine, and further comprising means for selectively energizing said controllable medium to control vibration therein.

16. The controllable device as claimed in claim 1, wherein said device is interconnected between a frame and a moving memeber in an exercise apparatus.

* * * * *